(12) United States Patent
Ono

(10) Patent No.: US 6,823,130 B1
(45) Date of Patent: Nov. 23, 2004

(54) INFORMATION SIGNAL REPRODUCING APPARATUS AND METHOD HAVING IMPROVED SEARCH FUNCTION UTILIZING ALTERNATIVE SUBDATA DETECTION AND DETERMINATION CHARACTERISTICS

(75) Inventor: Yasumasa Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,306

(22) Filed: Nov. 19, 1999

(30) Foreign Application Priority Data

Nov. 25, 1998 (JP) ............................................ 10-334097

(51) Int. Cl.[7] .............................................. H04N 5/783

(52) U.S. Cl. .............................. 386/68; 386/81; 386/95; 369/47.21

(58) Field of Search ............................ 386/6–8, 68, 81, 386/78–80, 69, 124, 95; 369/47.21, 47.28; 360/72.2, 49, 47; H04N 5/76, 5/92, 5/91, 9/79, 5/783

(56) References Cited

U.S. PATENT DOCUMENTS

| | | | | |
|---|---|---|---|---|
| 5,057,950 A | * | 10/1991 | Ozaki et al. ................ | 360/72.2 |
| 5,508,983 A | * | 4/1996 | Nakamura et al. ........ | 369/47.31 |
| 5,712,947 A | * | 1/1998 | Oguro et al. ................. | 386/69 |
| 5,805,469 A | * | 9/1998 | Okamoto et al. ........... | 702/189 |
| 5,818,652 A | * | 10/1998 | Ozaki et al. .................. | 360/27 |
| 5,835,668 A | * | 11/1998 | Yanagihara .................... | 386/95 |
| 5,844,739 A | * | 12/1998 | Mizushima et al. .......... | 360/48 |
| 5,862,296 A | * | 1/1999 | Oyama ........................ | 386/69 |
| 6,289,162 B1 | * | 9/2001 | Uehara et al. ................. | 386/1 |
| 6,314,233 B1 | * | 11/2001 | Oyama ........................ | 386/68 |

* cited by examiner

Primary Examiner—Thai Tran
(74) Attorney, Agent, or Firm—Fitzpatrick, Cella, Harper & Scinto

(57) ABSTRACT

A reproducing apparatus is arranged to reproduce main data from a recording medium and to reproduce subdata related to the main data and recorded on a first area and a second area of the recording medium. When subdata having the same value has been detected from the first area n times (n being an integer not less than 2), or when subdata having the same value has been detected from the second area m times (m being an integer not less than 2), the reproducing apparatus determines the value of the detected subdata.

16 Claims, 13 Drawing Sheets

INFORMATION SIGNAL REPRODUCING APPARATUS AND METHOD HAVING IMPROVED SEARCH FUNCTION UTILIZING ALTERNATIVE SUBDATA DETECTION AND DETERMINATION CHARACTERISTICS

BACKGROUND OF THE INVENTION

1. Field of the Invention

The present invention relates to an information signal reproducing apparatus, and more particularly to an apparatus for reproducing an information signal together with additional information.

2. Description of Related Art

Digital recording and reproducing apparatuses for recording and reproducing video data and/or audio data, as digital data, on and from a magnetic tape, are known. As one of various formats for a digital VTR (video tape recorder) or VCR (video cassette recorder) of such a type for recording and reproducing video data as digital data, a format for recording and reproducing, together with the recording data, auxiliary data related to image data to be recorded (hereinafter, the auxiliary data being referred to as the system data) has been proposed by the HD-Digital VCR Conference. In this format, a recording date, tape position information, and the like are recorded on a magnetic tape, as the system data together with image data.

For example, system data indicative of a recording date is recorded on each of a subcode sector, a video sector and an audio sector of each track formed on a tape T shown in FIG. 1. The system data recorded on the video sector is recorded on a portion thereof indicated by "VAUX DATA" in FIG. 2, in units of one sync block (90 bytes). In addition, error correction check data for the video sector is recorded in the form of a product code composed of inner parity data and outer parity data, as shown in FIG. 2. FIG. 2 shows the manner in which data is recorded on the video sector of one track. The VAUX data is recorded on three sync blocks of sync block Nos. 19, 20 and 156, and the video data is recorded on 135 sync blocks of sync block Nos. 21 to 155.

On the subcode sector, only the system data is recorded. The subcode sector is composed of data in units of one sync block (12 bytes), as shown in FIG. 3. In addition, error correction check data for the subcode sector is recorded only as inner parity data, as shown in FIG. 3. FIG. 3 shows the manner in which data is recorded on the subcode sector of one track. The data recorded on the subcode sector is composed of 12 sync blocks of sync block Nos. 0 to 11.

In a search mode in which the magnetic tape on which data has been recorded as described above travels at a speed which is n times (n>1) a speed used at the time of recording the data, the entire area of one track cannot be traced by a magnetic head, as indicated by a broken line in FIG. 4. In addition, when the tape traveling speed is increased to a higher speed, the possibility that the VAUX data, which has a large one-sync block length, can be reproduced by one tracing operation becomes lower than the possibility that the subcode data, which has a small one-sync block length, can be reproduced by one tracing operation. On the other hand, since the VAUX data is subjected to error correction using the inner parity data and the outer parity data, the VAUX data does not easily cause erroneous detection and uncorrectable error of the system data, as compared with the subcode data, which has only the inner parity data.

A known function using date data as the system data recorded as described above, is a date search function. When a date search is to be performed, an operation of detecting a change point of recording dates has the following problems. More specifically, when system data is to be detected, in general, the system data is repeatedly reproduced a plurality of times to prevent erroneous detection. When the contents of the repeatedly reproduced system data coincide with each other, the contents are determined/confirmed. Therefore, in a case where recording-date data is recorded on or reproduced from both the VAUX data and the subcode data, since an error of the VAUX data is corrected using the inner parity data and the outer parity data, and an error of the subcode data is corrected using only the inner parity data, the number of times of repeated reading operations of the subcode must be made larger than the number of times of repeated reading operations of the VAUX data in order to prevent erroneous detection.

In addition, as the traveling speed of the magnetic tape increases, the magnetic head cannot completely trace each track of the magnetic tape, as indicated by the broken line in FIG. 4. In this case, when the VAUX data, in which one sync block is composed of 90 bytes, is compared with the subcode data, in which one sync block is composed of 12 bytes, the possibility that the subcode data, in which one sync block has a smaller amount of data, can be detected is higher than the possibility that the VAUX data can be detected, even if the traveling speed of the magnetic tape becomes sufficiently high as to make it impossible to completely trace each track. In other words, the tape traveling speed at which the subcode data can be detected is generally higher than the tape traveling speed at which the VAUX data can be detected.

Therefore, when recording-date data is to be detected from the VAUX data or the subcode data, it is necessary to set the number of times of repeated reading operations to that of the subcode data, and it is necessary to set the tape traveling speed to a speed at which the VAUX data can be detected. As a result, a detection speed of the recording-date data becomes low.

BRIEF SUMMARY OF THE INVENTION

It is an object of the present invention to overcome the problems described above.

It is another object of the present invention to rapidly detect additional information recorded on a recording medium.

To attain the above objects, in accordance with one aspect of the invention, there is provided a reproducing apparatus, comprising reproducing means for reproducing main data and subdata related to the main data from a recording medium, the subdata being recorded on a first area and a second area of the recording medium, and determining means for detecting the subdata reproduced by the reproducing means, where the determining means determines/confirms the value of the detected subdata when (i) subdata having the same value has been detected from the first area n times (n being an integer not less than 2), or (ii) when subdata having the same value has been detected from the second area m times (m being an integer not less than 2).

It is still another object of the present invention to make it possible to perform excellent searching.

The above and other objects and features of the present invention will become apparent from the following detailed description of a preferred embodiment thereof taken in connection with the accompanying drawings.

DETAILED DESCRIPTION OF THE INVENTION

Hereinafter, a preferred embodiment of the present invention will be described in detail with reference to the drawings.

Figure 5:
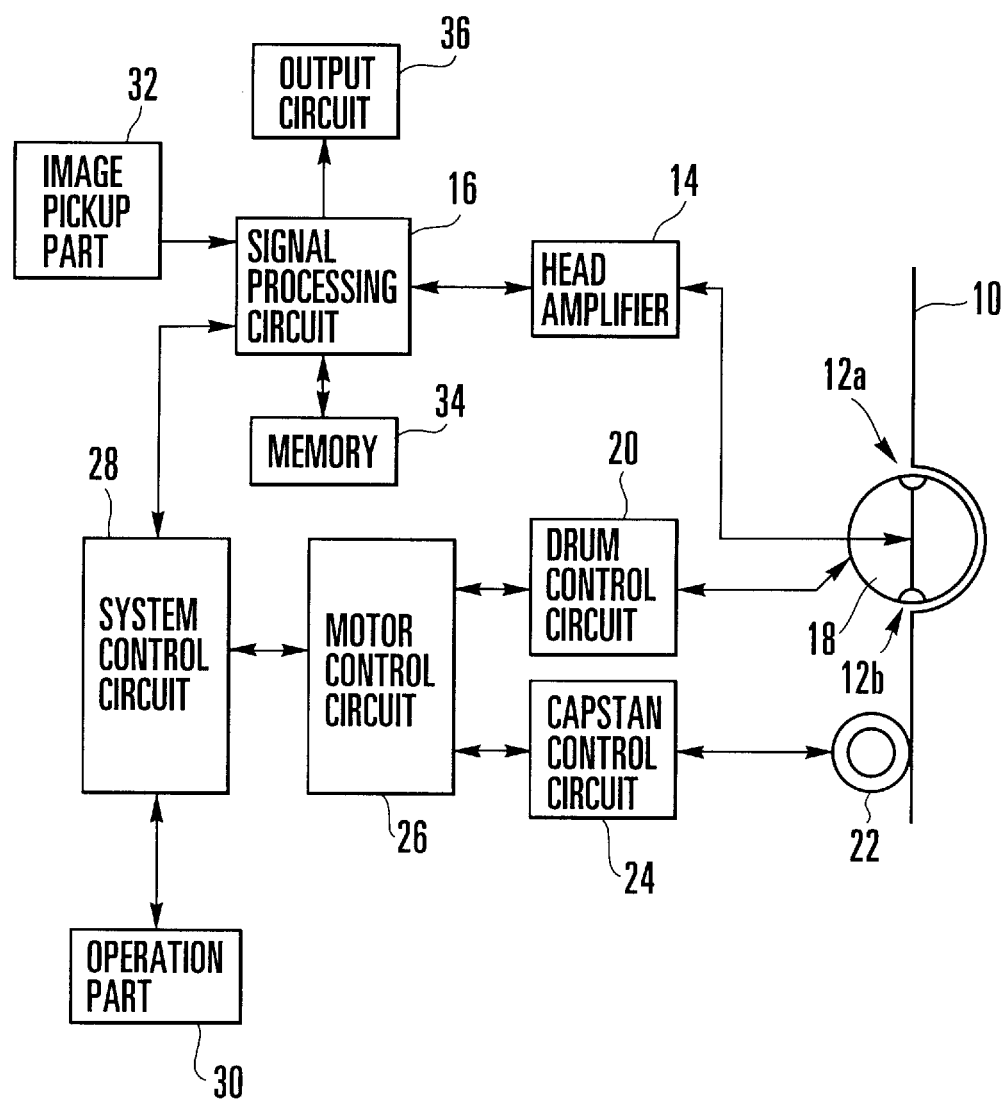
FIG. 5 is a block diagram showing the arrangement of a digital VTR to which the invention is applied.

FIG. 5 is a block diagram showing in outline the arrangement of a consumer-use digital VTR according to an embodiment of the present invention.

Figure 1:
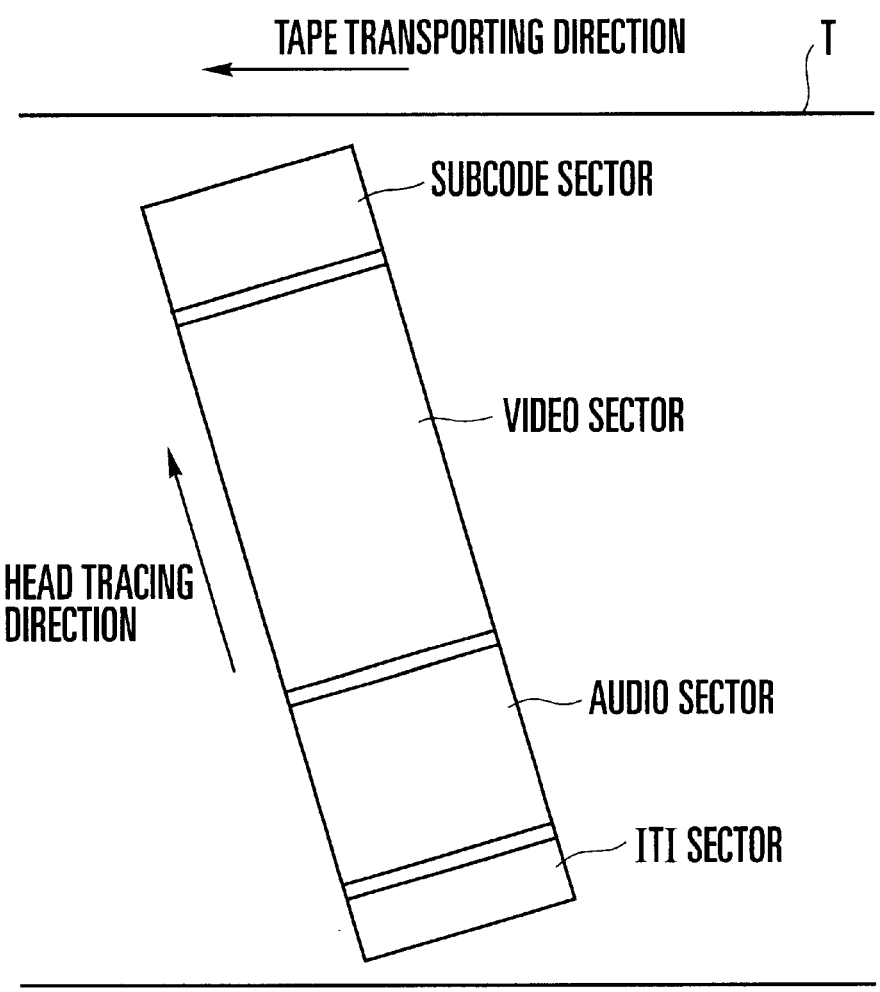
FIG. 1 is a diagram showing a format of each track on a tape.

In FIG. 5, there are illustrated a magnetic tape 10 serving as a recording medium, recording/reproducing heads 12a and 12b for recording and reproducing a signal on and from the magnetic tape 10, a head amplifier 14 for amplifying a signal to be recorded to apply the amplified signal to the recording/reproducing heads 12a and 12b and for amplifying reproduction outputs from the recording/reproducing heads 12a and 12b, a signal processing circuit 16 for outputting image data supplied from an image pickup part 32 and system data supplied from a system control circuit 28 to the head amplifier 14, and for processing a reproduction signal from the head amplifier 14 to separately output system data, video data, and audio data from a subcode sector, a video sector, an audio sector and an ITI sector shown in FIG. 1, a drum 18 for rotating the recording/reproducing heads 12a and 12b, a drum control circuit 20 for rotating the drum 18, a capstan 22 for driving/guiding travel of the magnetic tape 10, a capstan control circuit 24 for controlling a rotational speed of the capstan 22, i.e., a traveling speed of the magnetic tape 10, a motor control circuit 26 for controlling two motors of the drum control circuit 20 and the capstan control circuit 24, the system control circuit 28 for controlling the entire system, an operation part 30 to be operated by the operator to input various instructions to the system control circuit 28, the image-pickup part 32, a memory 34, and an output circuit 36 for outputting reproduced image data output from the signal processing circuit 16 to an external monitor or the like.

First, an ordinary recording operation of the digital VTR will be described below.

When the system control circuit 28 receives a recording start instruction from the operation part 30, the system control circuit 28 outputs a control signal to the motor control circuit 26. The motor control circuit 26 controls the drum control circuit 20 to rotate the drum 18 at a predetermined speed, and controls the capstan control circuit 24 to rotate the capstan 22 at a predetermined rotational frequency so as to drive/guide travel of the magnetic tape 10 at a predetermined speed S.

Figure 2:
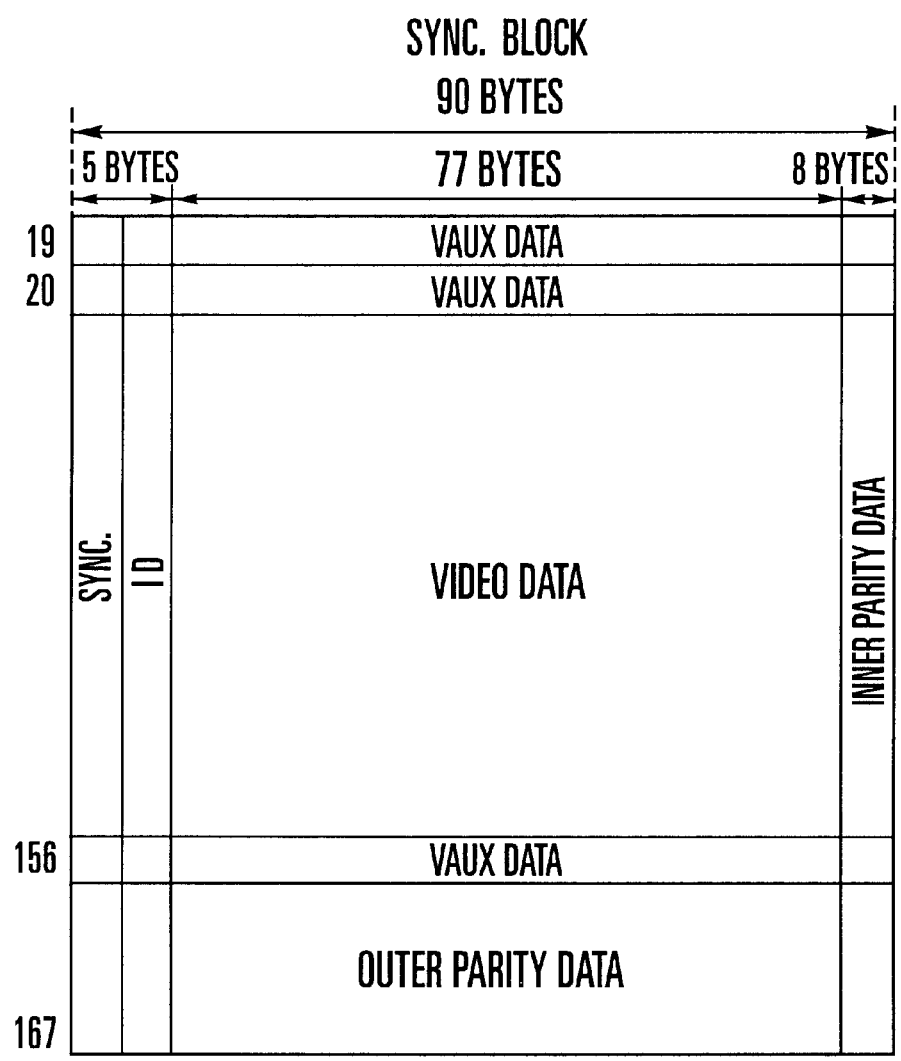
FIG. 2 is a diagram showing data recorded on a video sector shown in FIG. 1.
Figure 3:
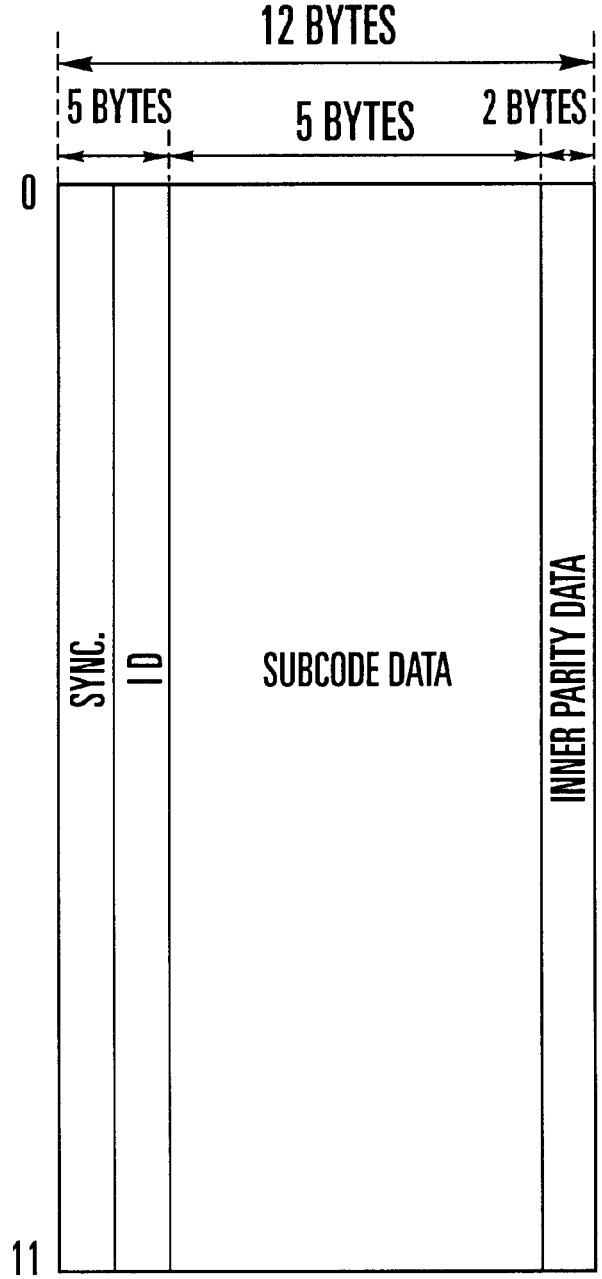
FIG. 3 is a diagram showing data recorded on a subcode sector shown in FIG. 1.

The image pickup part 32 has a known CCD, an optical system, a camera signal processing circuit and the like, and outputs a digital image signal to the signal processing circuit 16. The system control circuit 28 obtains date information using a built-in timer, generates system data together with "track No." information or the like, and outputs the system data and the track No. information or the like to the signal processing circuit 16. The signal processing circuit 16 codes image data supplied from the image pickup part 32 and compresses the amount of information of the image data. Then, the signal processing circuit 16 performs an error correction coding process on the system data from the system control circuit 28 and the coded image data using the memory 34, converts this data into a data form as shown in FIGS. 2 and 3, and outputs each sync block to the recording/reproducing heads 12a and 12b through the head amplifier 14.

The recording/reproducing heads 12a and 12b, which have respective different azimuths, alternately trace the magnetic tape 10 to form a track as shown in FIG. 1, and to record data supplied from the head amplifier 14.

Next, a reproducing operation of the digital VTR will be described below.

When the system control circuit 28 receives an ordinary reproducing instruction from the operation part 30, the system control circuit 28 controls the motor control circuit 26 so as to rotate the drum 18 at a speed equal to the speed used at the time of the recording operation, and to rotate the capstan 22 at a speed equal to the speed used at the time of the recording operation so as to drive/guide travel of the magnetic tape 10 at the speed S. In addition, the motor control circuit 26 controls the capstan control circuit 24 so as to perform tracking control according to a tracking error signal obtained by a tracking error signal generating circuit (not shown) on the basis of pilot signals included in the reproduced signal from the magnetic tape 10.

Each of the recording/reproducing heads 12a and 12b traces the magnetic tape 10 so as to reproduce data recorded on the magnetic tape 10, and outputs the reproduced data to the signal processing circuit 16 through the head amplifier 14. The signal processing circuit 16 detects sync data from the reproduced data from the head amplifier 14 so as to write data of respective sync blocks in the memory 34 on the basis of ID signals of the sync blocks. Then, the signal processing circuit 16 performs an error correction process on the reproduced data in the memory 34, and separates system data from the reproduced data so as to output the system data to the system control circuit 28.

Further, the signal processing circuit 16 performs a process reverse to the process performed at the time of the recording operation, on the reproduced image data, so as to decode the reproduced image data and expand the amount of information of the reproduced image data, and outputs the processed image data to the output circuit 36. The output circuit 36 converts the decoded image data into data having a form appropriate to an external monitor so as to output the converted image data.

The system control circuit 28 is able to control transport of the magnetic tape 10, in a manner as will be described later, on the basis of the system data obtained as described above.

The signal processing circuit 16 will be described below.

Figure 6:
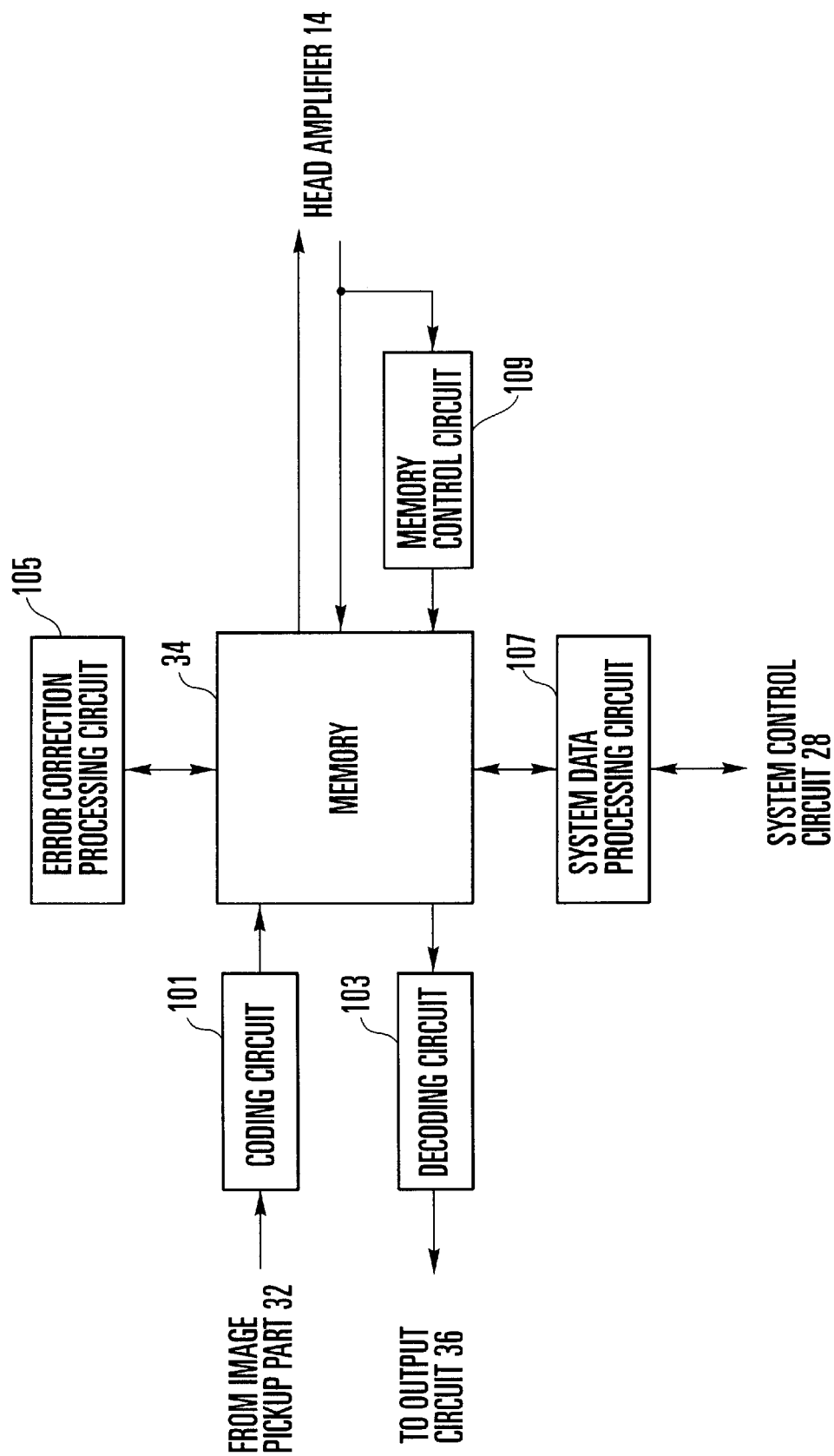
FIG. 6 is a block diagram showing the arrangement of a signal processing circuit shown in FIG. 5.

FIG. 6 is a block diagram showing the arrangement of the signal processing circuit 16.

In FIG. 6, at the time of a recording operation, a coding circuit 101 receives image data from the image pickup part 32, performs a high-efficient coding process, such as known DCT, variable-length coding or the like, on the image data, compresses the amount of information of the image data, and outputs the processed image data to the memory 34. A system data processing circuit 107 writes the system data supplied from the system control circuit 28 at a predetermined address of the memory 34. An error correction processing circuit 105 performs an error correction coding process on the image data and the system data stored in the memory 34 so as to generate data having the form shown in FIGS. 2 and 3. A memory control circuit 109 adds sync data to the data subjected to the error correction coding so as to form sync blocks, and reads the data in every sync block from the memory 34 so as to output the data to the head amplifier 14.

Next, at the time of a reproducing operation, reproduced data from the head amplifier 14 is output to the memory 34 and the memory control circuit 109. The memory control circuit 109 detects the sync data and the ID signals from the received data, and writes the reproduced data from the head amplifier 14 in the memory 34 according to the detected ID signals.

The error correction processing circuit 105 performs error correction of the reproduced data stored in the memory 34 using parity data added at the time of the recording operation. The system data processing circuit 107 detects the system data of VAUX data and subcode data from the reproduced data stored in the memory 34 on the basis of the address of the memory 34, and outputs the system data to the system control circuit 28. On the other hand, the image data is output to a decoding circuit 103 from the memory 34. The decoding circuit 103 performs a process reverse to the process performed in the encoding circuit 101, on the image data, and outputs the processed image data to the output circuit 36.

Figure 7:
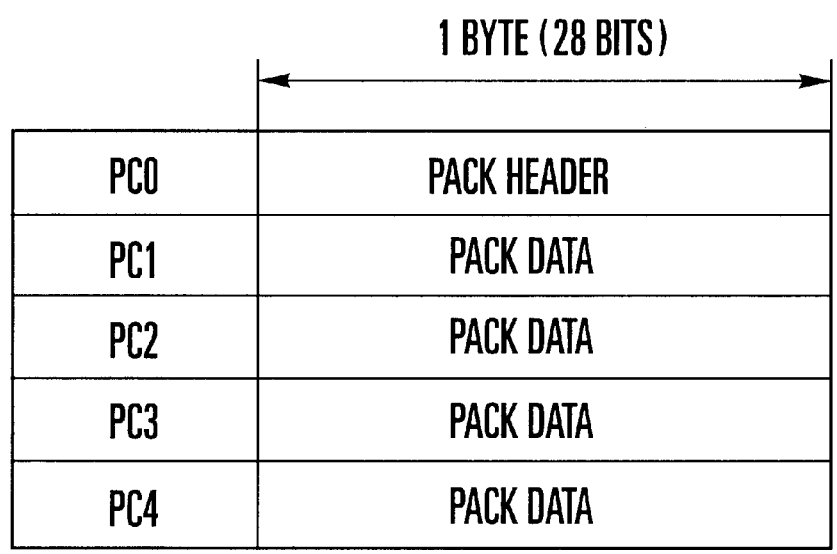
FIG. 7 is a diagram showing a recording form of system data.

Next, system data including photographing/recording date information will be described below. System data indicative of the photographing/recording date is recorded on the subcode sector, the video sector, and the audio sector shown in FIG. 1. In the subcode sector, the photographing/recording date information is recorded on the subcode data area shown in FIG. 3 in the form of pack data, as shown in FIG. 7. In the video sector, the photographing/recording date information is recorded on the VAUX data area shown in FIG. 2 in the form of pack data, as shown in FIG. 7.

Figure 4:
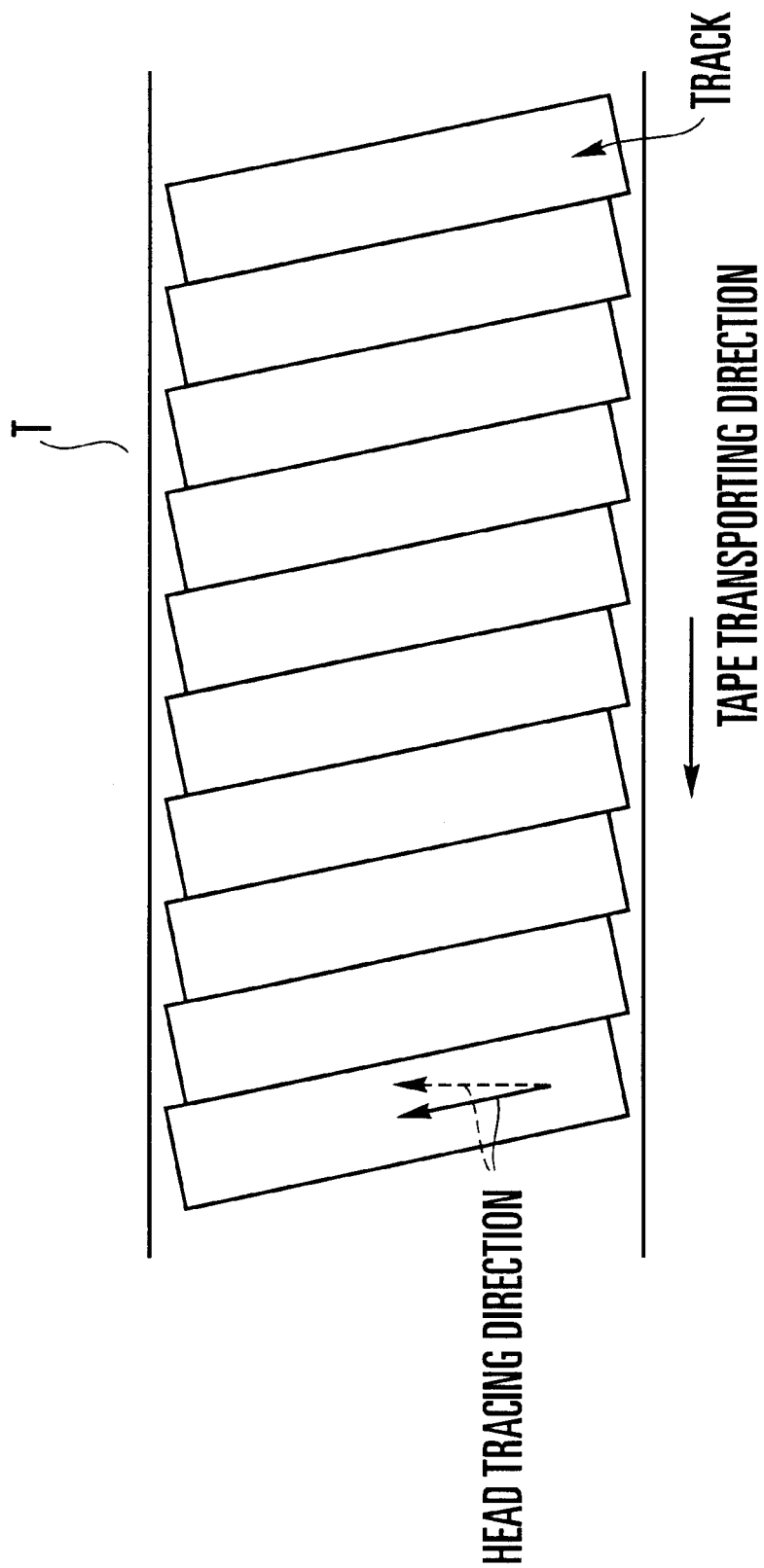
FIG. 4 is a diagram showing the manner in which a recording/reproducing head traces a tape.

The digital VTR according to the present embodiment has a function called date search, in which the photographing/recording date information recorded on the area for the VAUX data or the subcode data is detected while the magnetic tape is traveling at a speed equal to or higher than the recording speed S, so as to search for a point where the photographing/recording date changes. As the traveling speed of the magnetic tape increases, the magnetic head cannot completely trace each track, as indicated by the broken line in FIG. 4, and erroneous detection of data becomes apt to easily occur.

As a countermeasure for this, the following operation is effected. That is, a change point of recording dates is detected using recording-date data detected from either one of the VAUX data and the subcode data, so that a period of time required to detect the change point of recording dates can be shortened. Further, in order to prevent erroneous detection, recording-date data is repeatedly detected, and when the detection results coincide with each other continuously, the detection result is determined/confirmed as recording-date data. In a case where the recording-date data is detected from both the VAUX data and the subcode data, an error of the VAUX data can be corrected using the inner parity data and the outer parity data shown in FIG. 2, while an error of the subcode data can be corrected using only the inner parity data shown in FIG. 3, as described above. Therefore, as the number of times of repeated reading operations for preventing erroneous detection, the number of times of reading operations of the subcode data is set equal to or larger than the number of times of reading operations of the VAUX data. More specifically, when the number of times of repeated reading operations of the subcode data during the date search is set to be n (n being an integer not less than 1), and when the number of times of repeated reading operations of the VAUX data is set to be m (m being an integer not less than 1), a relation of "n≧m" is obtained.

Figure 8:
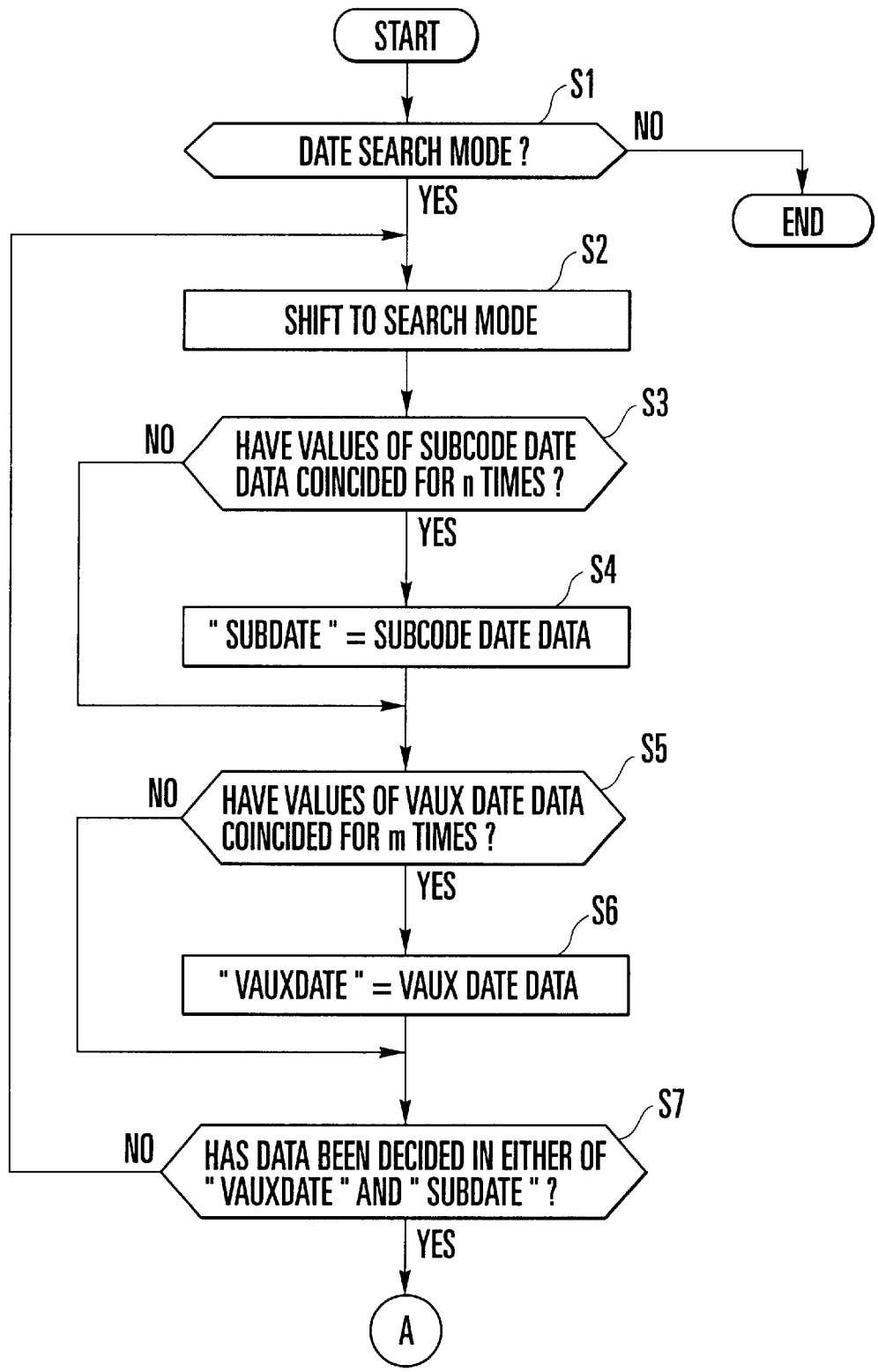
FIGS. 8A and 8B are flow charts showing an operation during the date search in the VTR shown in FIG. 5.
Figure 8:
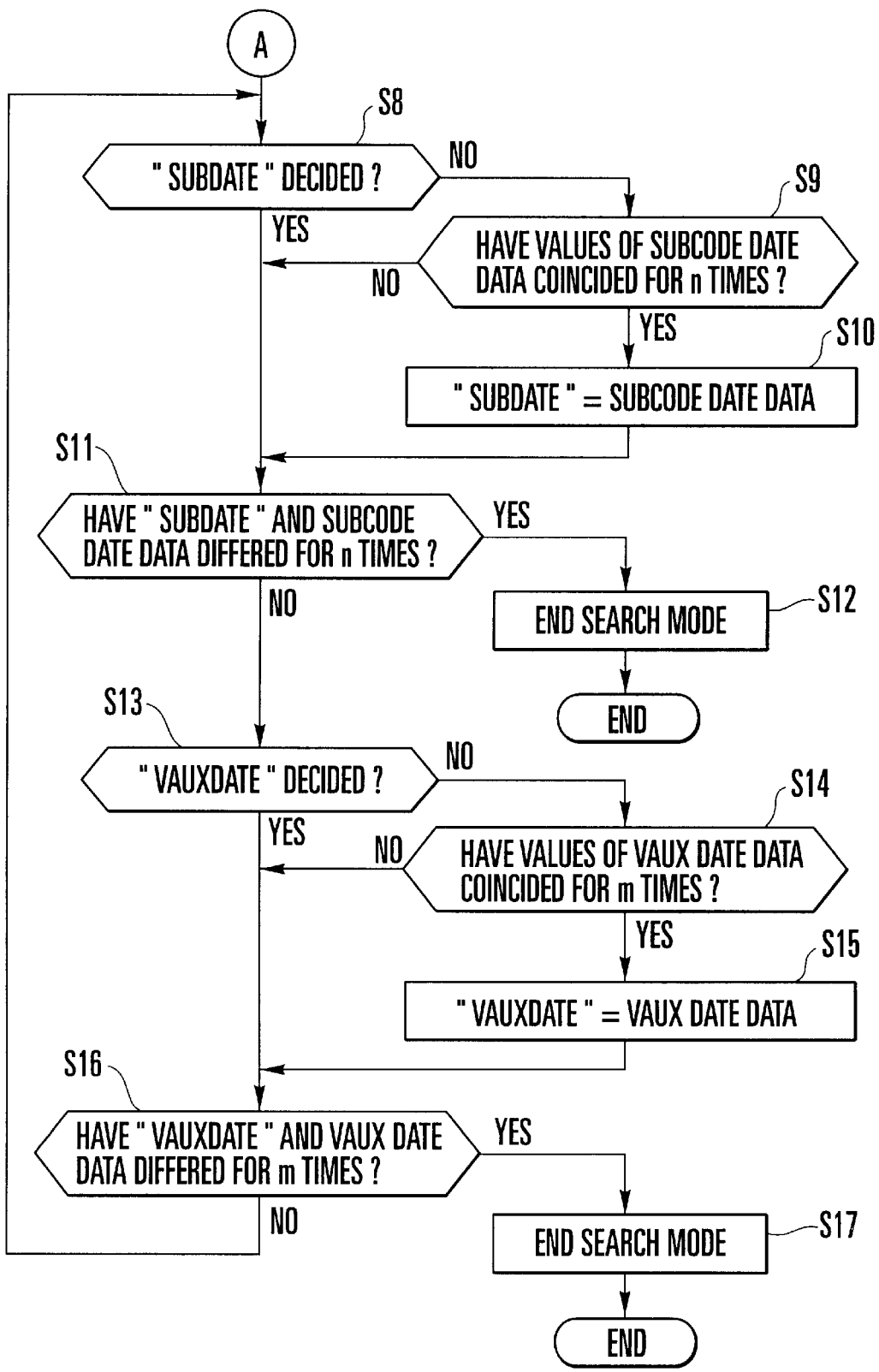

FIGS. 8A and 8B are flow charts showing the operation in a date search mode of the digital VTR. The operation in the date search mode according to the embodiment will be described below with reference to FIGS. 8A and 8B.

When a video camera operator intends to perform a date search, the operator inputs a corresponding instruction to the system control circuit 28 using the operation part 30. This instruction can be made by operating switches, such as "+" and "−" switches, of the operation part 30. Then, the system control circuit 28 sets the date search mode according to this instruction (S1) to cause the motor control circuit 26, the drum control circuit 20, and the capstan control circuit 24 to operate the drum 18 and the capstan 22 in the search mode (S2). In the search mode, the drum 18 rotates at a speed equal to the speed used at the time of the recording operation, and the capstan 22 drives/guides the magnetic tape 10 to travel at a predetermined speed $S_1$ higher than the tape speed S used at the time of the recording operation.

Reproduction outputs from the magnetic heads 12a and 12b are amplified by the head amplifier 14 and processed by the signal processing circuit 16. The signal processing circuit 16 supplies photographing/recording-date data obtained from the reproduction data to the system control circuit 28, as described above.

In order to detect a change point of photographing/recording dates, first, the system control circuit 28 has to determine/confirm the value of date data at the present position of the magnetic tape. More specifically, when the values of date data recorded on the subcode sector output from the signal processing circuit 16 have coincided with each other n times (S3) during the search mode (S2), the system control circuit 28 stores the date data recorded on the subcode sector in a variable SUBDATE (S4). Similarly, when the values of date data recorded on the VAUX data area of the video sector have coincided with each other m times (S5), the system control circuit 28 stores the date data recorded on the VAUX data area of the video sector in a variable VAUXDATE (S6). Until the date data is determined/confirmed in either one of the variable SUBDATE and the variable VAUXDATE (S7), i.e., until the date data is stored in the variable SUBDATE or the variable VAUXDATE, operation of the system control circuit 28 returns to step S2 to repeat operation in the search mode.

In a case where the date data has been determined/confirmed in either one of the variable SUBDATE and the variable VAUXDATE (S7), if the variable SUBDATE is undetermined (S8), when the values of date data recorded on the subcode sector have coincided with each other n times (S9), the system control circuit 28 stores the date data in the variable SUBDATE (S10). If the variable SUBDATE has been determined (S8 to S10), it is checked whether the value of the variable SUBDATE and the value of date data detected from the subcode sector output from the signal processing circuit 16 have differed from each other continuously n times (S11). If the value of the variable SUBDATE and the value of date data detected from the subcode sector have differed from each other continuously n times (S11), the system control circuit 28 determines that a change point of dates has been detected, ends the search mode, and also ends the date search mode (S12). Then, the system control circuit 28 shifts to the ordinary reproducing operation.

In a case where the value of the variable SUBDATE and the value of date data detected from the subcode sector have not differed from each other continuously n times (S11), if the variable VAUXDATE is undetermined (S13), when the values of date data recorded on the VAUX data area output from the signal processing circuit 16 have coincided with each other m times (S14), the system control circuit 28 stores the date data detected from the VAUX data area in the variable VAUXDATE (S15). If the variable VAUXDATE has been determined (S13 and S15), it is checked whether the value of the variable VAUXDATE and the value of date data detected from the VAUX data area have differed from each other continuously m times (S16). If the value of the variable VAUXDATE and the value of date data detected from the VAUX data area have differed from each other continuously m times (S16), the system control circuit 28 determines that a change point of dates has been detected, ends the search mode, and also ends the date search mode (S17). Then, the system control circuit 28 shifts to the ordinary reproducing operation.

If the value of the variable VAUXDATE and the value of date data detected from the VAUX data area have not differed from each other continuously m times (S16), the processes of step S8 and subsequent steps are repeated.

According to the present embodiment, after either one of the date data recorded on the subcode sector and the date data recorded on the VAUX data area is determined, if the value of either one of the date data recorded on the subcode sector and the date data recorded on the VAUX data area changes, it is determined that a change point of dates has been detected, so that the date search is ended.

As described above, when the date data recorded on the subcode sector has differed from the variable SUBDATE continuously n times or when the date data recorded on the VAUX data area of the video sector has differed from the variable VAUXDATE continuously m times, it is determined that the recording date has changed. Accordingly, a change point of dates can be rapidly detected and determined.

Figure 9:
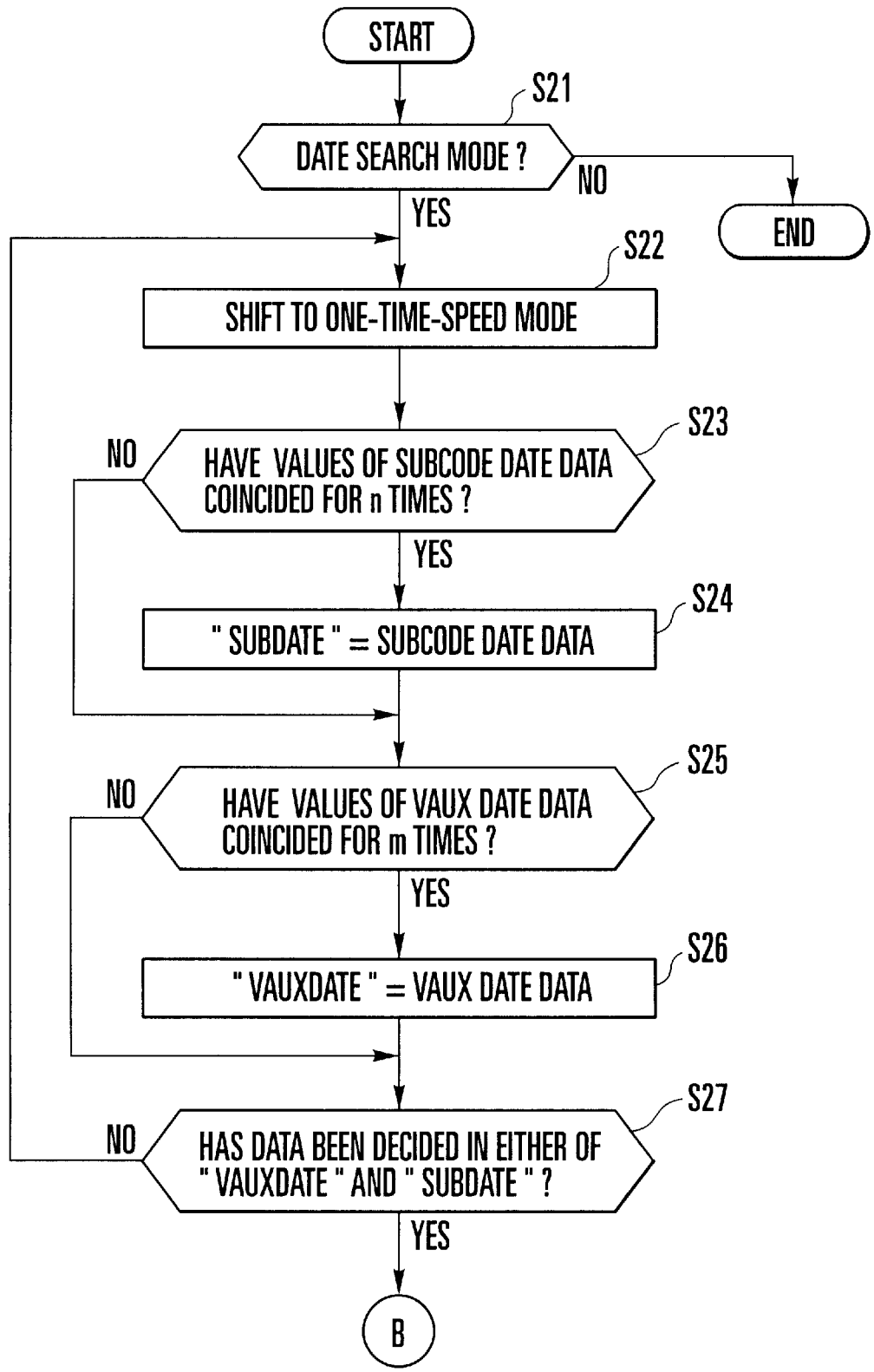
FIGS. 9A and 9B are flow charts showing another operation during the date search in the VTR shown in FIG. 5.
Figure 9:
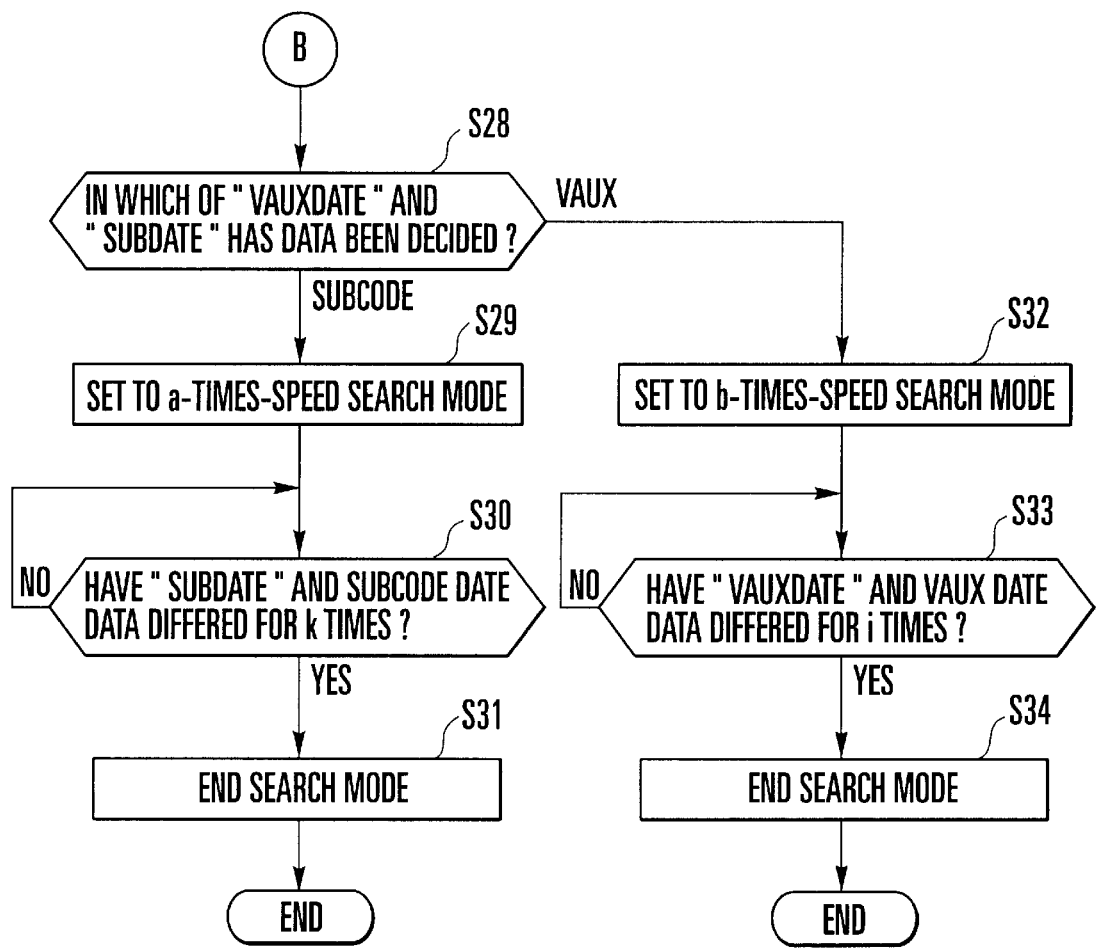

Next, an operation in which the process of detecting a change point of dates after the determination of a recording date is modified will be described below. FIGS. 9A and 9B are flow charts showing this operation.

As described above, when the VAUX data, in which one sync block is composed of 90 bytes, and the subcode data, in which one sync block is composed of 12 bytes, are compared with each other, recording-date data can be correctly detected from the subcode data, in which one sync block has a smaller amount of data, even when the traveling speed of the magnetic tape is higher than the traveling speed for the VAUX data. Furthermore, the possibility that recording-date data can be correctly detected from the subcode data even if the tracks cannot be completely traced is higher than the possibility for the VAUX data. In other words, the tape traveling speed adapted to make it possible to detect the recording-date data from the subcode data is equal to or higher than the tape traveling speed adapted to make it possible to detect the recording-date data from the VAUX data. Thus, when the tape traveling speed at which the recording-date data is detected from the subcode data is set to be a-times speed (a>1), and when the tape traveling speed at which the recording-date data is detected from the VAUX data is set to be b-times speed (b>1), a relation of "a≧b" is obtained.

Further, when the recording-date data is to be detected from the VAUX data or the subcode data, in order to prevent erroneous detection, the same portion is repeatedly read, as described above. Then, it is preferred that, as the tape traveling speed further increases, the number of times of repeated reading operations is increased to prevent erroneous detection. More specifically, with respect to the subcode data, the number of times of repeated reading operations for preventing erroneous detection is set to be n, as described above, when the tape traveling speed is the one-time speed, and the number of times of repeated reading operations is set to be k (k being an integer not less than 1, and k>n) when the tape traveling speed is the a-times speed. With respect to the VAUX data, the number of times of repeated reading operations is set to be m, as described above, when the tape traveling speed is the one-time speed, and the number of times of repeated reading operations is set to be i (i being an integer not less than 1, and i>m) when the tape traveling speed is the b-times speed.

The above operation will be described below in detail with reference to FIGS. 9A and 9B. When a video camera operator intends to perform a date search, the operator inputs a corresponding instruction to the system control circuit 28 using the operation part 30. The system control circuit 28 sets a date search mode according to this instruction (S21) so as to cause the motor control circuit 26, the drum control circuit 20, and the capstan control circuit 24 to operate the drum 18 and the capstan 22 in a one-time-speed mode (S22). More specifically, in the one-time-speed mode, the drum 18 is rotated at a speed equal to the speed used at the time of the recording operation, and the magnetic tape 10 is driven/guided to travel traveled at a speed S equal to the speed used at the time of the recording operation.

Reproduction outputs from the magnetic heads 12a and 12b are amplified by the head amplifier 14 and processed by the signal processing circuit 16. The signal processing circuit 16 supplies photographing/recording-date data obtained from the reproduction data to the system control circuit 28.

In order to detect a change point of photographing/recording dates, first, the system control circuit 28 has to decide date data at the present position of the magnetic tape 10. More specifically, when the values of date data recorded on the subcode sector have coincided with each other n times (S23) during the one-time-speed mode (S22), the system control circuit 28 stores the date data recorded on the subcode sector in a variable SUBDATE (S24). When the values of date data recorded on the VAUX data area of the video sector have coincided with each other m times (S25), the system control circuit 28 stores the date data recorded on the VAUX data area of the video sector in a variable VAUXDATE (S26). Until the date data is determined in either one of the variable SUBDATE and the variable VAUXDATE (S27), the operation of the system control circuit 28 returns to step S22 to repeat the operation in the one-time-speed mode.

If the date data has been determined in the variable SUBDATE (S28), the system control circuit 28 sets the drum

18 and the capstan 22 in an a-times-speed search mode (S29). When the variable SUBDATE and the value of the date data detected from the subcode sector have differed from each other continuously k times (S30), the system control circuit 28 determines that a change point of date's has been detected, ends the search mode, and shifts to the ordinary reproducing operation (S31). Incidentally, in the a-times-speed search mode, the drum 18 is rotated at a speed equal to the speed used at the time of the recording operation, and the magnetic tape 10 is transported at a speed Sa which corresponds to the a-times speed and is higher than the speed used at the time of the recording operation.

If the date data has been determined in the variable VAUXDATE (S28), the system control circuit 28 sets the drum 18 and the capstan 22 in a b-times-speed search mode (S32). When the variable VAUXDATE and the date data detected from the VAUX data area have differed from each other continuously i times (S33), the system control circuit 28 determines that a change point of dates has been detected, ends the search mode and shifts to the ordinary reproducing operation (S34). Incidentally, in the b-times-speed search mode, the drum 18 is rotated at a speed equal to the speed used at the time of the recording operation, and the magnetic tape 10 is transported at a speed Sb (Sa>Sb) which is higher than the speed used at the time of the recording operation.

As described above, after the value of the date data recorded on either one of the subcode sector and the VAUX data area is determined, the traveling speed of the magnetic tape is set to be the speed corresponding to the determined date data, so as to search for a change point of dates. Accordingly, the change point of dates can be rapidly and correctly detected.

Figure 10A:
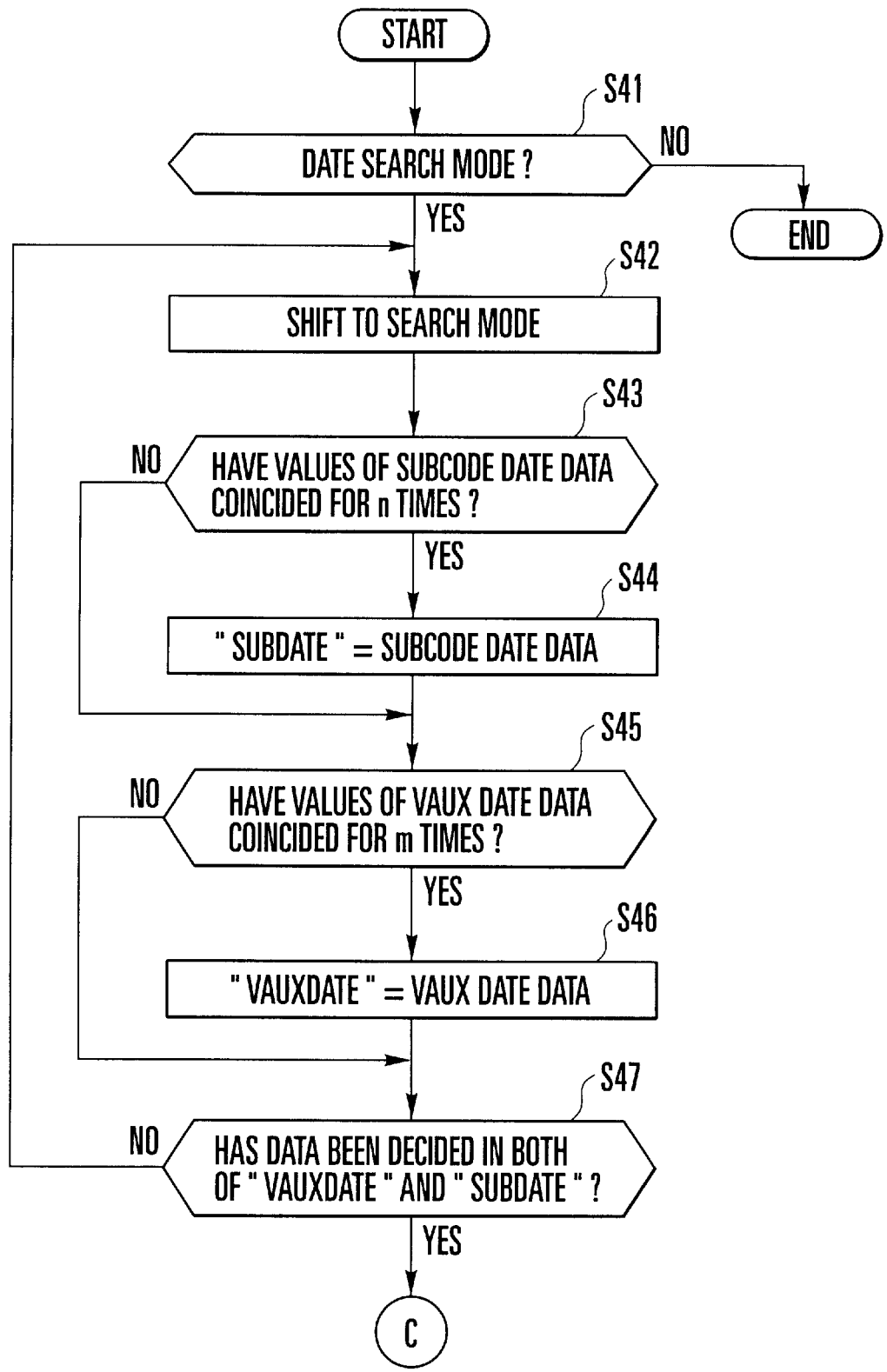
FIGS. 10A and 10B are flow charts showing still another operation during the date search in the VTR shown in FIG. 5.
Figure 10:
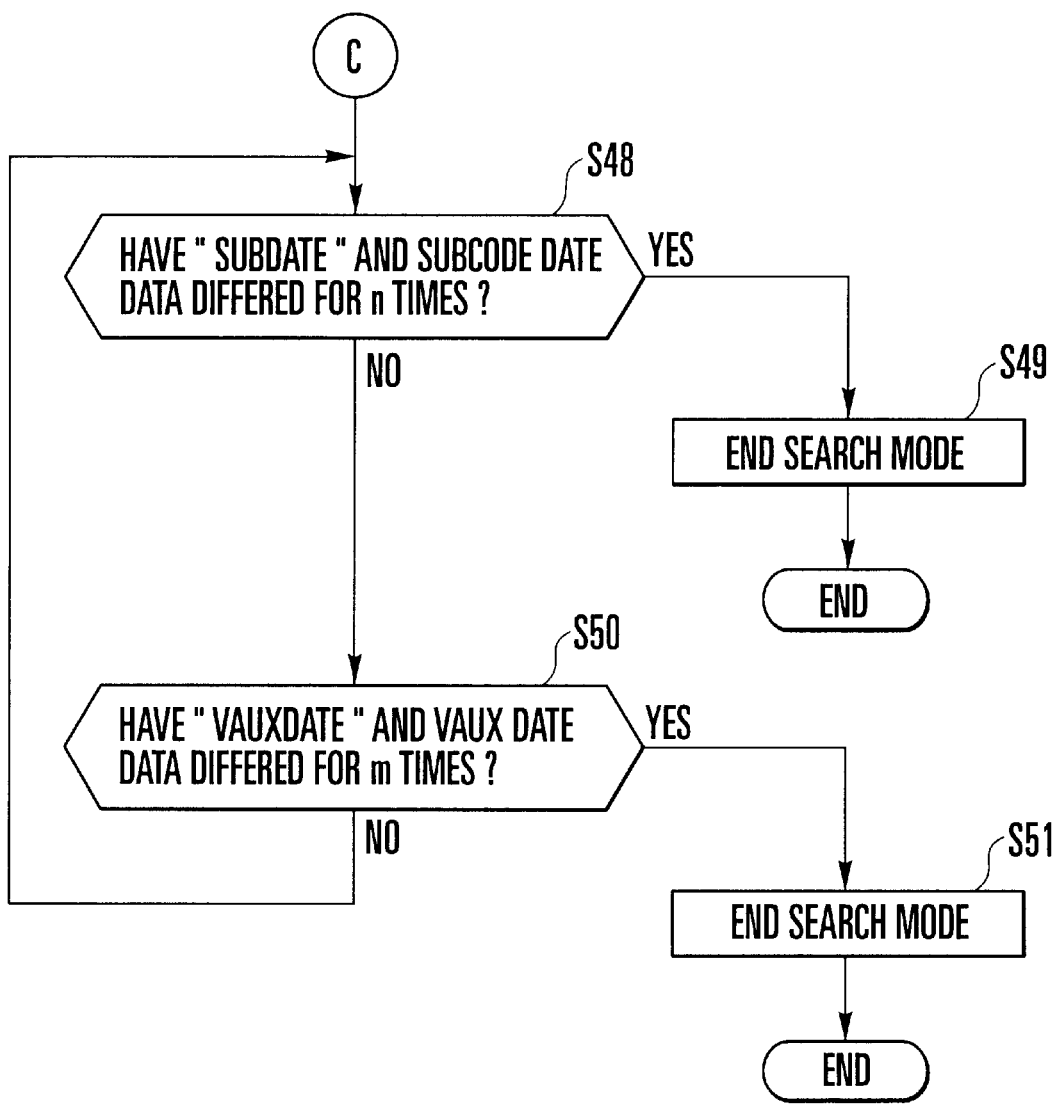

Next, the process of detecting a change point of dates after determining both recording-date data detected from the VAUX data area and recording-date data detected from the subcode sector will be described below. FIGS. 10A and 10B are flow charts showing this process.

As described above, while an error of data from the VAUX data area is corrected using the inner parity data and the outer parity data, an error of data from the subcode sector is corrected using only the inner parity data. Therefore, in order to prevent erroneous detection, it is preferred that the number of times of repeated reading operations from the subcode sector is equal to or larger than the number of times of repeated reading operations from the VAUX data area. Thus, when the number of times of repeated reading operations of the subcode sector in searching is set to be n (n being an integer not less than 1), and the number of times of repeated reading operations of the VAUX date area is set to be m (m being an integer not less than 1), it is preferable that a relation of "n≧m" is obtained.

The above operation will be described below with reference to FIGS. 10A and 10B. When a video camera operator intends to perform a date search, the operator inputs a corresponding instruction to the system control circuit 28 using the operation part 30. The system control circuit 28 sets a date search mode according to this instruction (S41) so as to cause the motor control circuit 26, the drum control circuit 20, and the capstan control circuit 24 to operate the drum 18 and the capstan 22 in a search mode (S42). This search mode is the same as that in step S2 in FIG. 8.

Reproduction outputs from the magnetic heads 12a and 12b are amplified by the head amplifier 14 and processed by the signal processing circuit 16. The signal processing circuit 16 supplies photographing/recording-date data obtained from the reproduction data to the system control circuit 28.

In order to detect a change point of photographing/recording dates, first, the system control circuit 28 has to determine date data at the present position of the magnetic tape 10. More specifically, when the values of date data recorded on the subcode sector have coincided with each other n times (S43) during the search mode (S42), the system control circuit 28 stores the date data recorded on the subcode sector in a variable SUBDATE (S44). When the values of date data recorded on the VAUX data area of the video sector have coincided with each other m times (S45), the system control circuit 28 stores the date data recorded on the VAUX data area of the video sector in a variable VAUXDATE (S46). Until the date data are determined in both the variable SUBDATE and the variable VAUXDATE (S47), the system control circuit 28 returns to step S42 to repeat the operation in the search mode.

After the date data is determined in both the variable SUBDATE and the variable VAUXDATE (S47), the following process is repeated. When the variable SUBDATE and the value of the date data detected from the subcode sector have differed from each other continuously n times (S48), the system control circuit 28 determines that a change point of dates has been detected, ends the search mode and shifts to the ordinary reproducing operation (S49). Also, when the variable VAUXDATE and the date data detected from the VAUX data area have differed from each other continuously m times (S50), the system control circuit 28 determines that a change point of dates has been detected, ends the search mode and shifts to the ordinary reproducing operation (S51). If neither the n-times differing or the m-times differing is determined, steps S48 and S50 are repeated until either one of them is determined.

As described above, after both the date data recorded on the subcode sector and the date data recorded on the VAUX data area of the video sector are detected and determined, when the date data recorded on the subcode sector has differed from the variable SUBDATE continuously n times or when the date data recorded on the VAUX data area of the video sector has differed from the variable VAUXDATE continuously m times, it is determined that a change point of dates has been detected, so that the change point of dates can be correctly detected.

As is easily apparent from the above description, the number of times of repeated reading operations for preventing erroneous detection is set to an optimum value in each of the respective areas in which subdata is recorded. When subdata has been detected even in only one of these areas, the subdata is determined/confirmed, so that the subdata can be rapidly detected.

Further, the recording-medium traveling speed at which subdata can be detected in all areas on which subdata to be detected is recorded is set so as to detect the subdata, and the recording-medium traveling speed is changed depending on the area in which the subdata has been detected, so that a detection operation can be quickly performed.

Furthermore, the number of times of repeated reading operations for preventing erroneous detection is set to an optimum value in each of the respective areas on which subdata is recorded. When the subdata has been detected in all areas, the subdata is determined/confirmed, so that the subdata can be correctly detected.

What is claimed is:

1. A reproducing apparatus, comprising:
   reproducing means for reproducing main data and subdata related to the main data from a recording medium, the subdata being recorded on a first area of the recording medium including the main data and a second area of the recording medium not including the main data; and determining means for detecting the subdata reproduced by said reproducing means during repeated reading operations of said reproducing means, for detecting multiplicity coincidence of the subdata for each of the first area and the second area, respectively, and for determining a value of the detected subdata (i) when subdata having the same value has been detected from the first area n times (n being a predetermined integer not less than 2), or (ii) when subdata having the same value has been detected from the second area m times (m being a predetermined integer not less than 2).

2. A reproducing apparatus according to claim 1, wherein subdata having the same value is recorded on the first area and the second area of the recording medium.

3. A reproducing apparatus according to claim 1, wherein said reproducing means has transport means for transporting the recording medium, and said determining means controls a transporting operation of said transport means in accordance with the value of the subdata determined by said determining means.

4. A reproducing apparatus according to claim 1, further comprising error detecting means for detecting errors in the main data and the subdata reproduced by said reproducing means, the subdata recorded on the first area and the subdata recorded on the second area being different from each other in amounts of data from which the errors can be detected.

5. A reproducing apparatus according to claim 4, wherein the subdata recorded on the first area is subjected to error correction coding in a product code composition, and the subdata recorded on the second area is subjected to error correction coding in only one direction.

6. A reproducing apparatus according to claim 1, wherein the recording medium includes a magnetic tape on which a plurality of tracks are formed, and each of the plurality of tracks has the first area and the second area.

7. A reproducing apparatus, comprising:

reproducing means for reproducing main data and subdata related to the main data from a recording medium, the subdata being recorded on a first area of the recording medium including the main data and a second area of the recording medium not including the main data; and determining means for detecting the subdata reproduced by said reproducing means during repeated reading operations of said reproducing means, for detecting multiplicity coincidence of the subdata for each of the first area and the second area, respectively, and for determining a value of the detected subdata when (i) subdata having the same value has been detected from the first area n times (n being a predetermined integer not less than 2) and (ii) subdata having the same value has been detected from the second area m times (m being a predetermined integer not less than 2).

8. A reproducing apparatus, comprising:

reproducing means for reproducing main data and subdata related to the main data from a recording medium, the subdata being recorded in a first area for the main data and a second area for the subdata of the recording medium;

transport means for transporting the recording medium;

detection means for detecting the subdata reproduced by said reproducing means;

search means for searching the main data in accordance with a detection result of said detection means; and mode setting means for setting a mode of said reproducing apparatus among a plurality of modes, the plurality of modes including:

a first search reproducing mode in which, while the recording medium is transported by said transport means at a first speed higher than a speed used for recording, said detecting means detects the subdata reproduced from the first area, and a second search reproducing mode in which, while the recording medium is transported by said transport means at a second speed higher than the speed used for recording, said detecting means detects the subdata reproduced from the second area.

9. A reproducing apparatus according to claim 8, further comprising:

instruction means for giving an instruction for search reproduction, wherein said detection means detects, in response to the instruction from said instruction means, the subdata reproduced from the first area and the subdata reproduced from the second area, and said mode setting means sets the mode in accordance with a detection result provided by said detection means.

10. A reproducing apparatus according to claim 9, wherein said mode setting means sets the first search reproducing mode or the second search reproducing mode in accordance with, of the subdata from the first area and the subdata from the second area, the subdata detected first by said detection means.

11. A reproducing apparatus according to claim 8, wherein said detection means controls a transporting operation of said transport means in accordance with the subdata detected by said detection means.

12. A reproducing apparatus according to claim 8, wherein the recording medium includes a magnetic tape on which a plurality of tracks are formed, and each of the plurality of tracks has the first area and the second area.

13. A reproducing apparatus, comprising:

reproducing means for reproducing main data and subdata related to the main data from a recording medium on which a plurality of tracks are formed, each of the plurality of tracks having a first area of the recording medium including the main data and a second area of the recording medium not including the main data, the subdata being recorded on the first area and the second area of the recording medium, the main data including image data, and the subdata including date data;

transport means for transporting the recording medium;

determining means for detecting date data reproduced by said reproducing means during repeated reading operations of said reproducing means, for detecting multiplicity coincidence of the subdata for each of the first area and the second area, respectively, and for determining a value of the detected date data, (i) when subdata having the same value has been detected from the first area n times (n being a predetermined integer not less than 2), or (ii) when subdata having the same value has been detected from the second area m times (m being a predetermined integer not less than 2); and control means for controlling a transporting operation of said transport means using the date data determined by said determining means.

14. An apparatus according to claim 13, wherein said control means changes a transporting speed of the recording medium by said transport means (i) when date data having a value different from the date data determined by said determining means is detected from the first area repeatedly n times, or (ii) when date data having a value different from the date data determined by said determining means is detected from the second area repeatedly m times.

15. A reproducing method, comprising the steps of:

reproducing main data and subdata related to the main data from a recording medium, the subdata being recorded on a first area of the recording medium including the main data and a second area of the recording medium not including the main data;

detecting the subdata reproduced in said reproducing step;

detecting multiplicity coincidence of the subdata for each of the first area and the second area, respectively; and determining a value of the subdata (i) when subdata having the same value has been detected from the first area n times (n being a predetermined integer not less than 2), or (ii) when subdata having the same value has been detected from the second area m times (m being a predetermined integer not less than 2).

16. A reproducing method, comprising the steps of:

reproducing main data and subdata related to the main data from a recording medium, the subdata being recorded on a first area of the recording medium including the main data and a second area of the recording medium not including the main data;

detecting the subdata reproduced in said reproducing step;

detecting multiplicity coincidence of the subdata for each of the first area and the second area, respectively; and determining a value of the subdata when (i) subdata having the same value has been detected from the first area n times (n being a predetermined integer not less than 2) and (ii) subdata having the same value has been detected from the second area m times (m being a predetermined integer not less than 2).

\* \* \* \* \*